United States Patent
Collet

(10) Patent No.: US 8,958,941 B2
(45) Date of Patent: Feb. 17, 2015

(54) DIAGNOSTIC METHOD AND DEVICE FOR A PURGE VALVE OF A HYBRID MOTOR VEHICLE

(75) Inventor: Thierry Collet, Fontenilles (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 212 days.

(21) Appl. No.: 13/581,487

(22) PCT Filed: Apr. 7, 2011

(86) PCT No.: PCT/EP2011/001727
§ 371 (c)(1),
(2), (4) Date: Oct. 23, 2012

(87) PCT Pub. No.: WO2011/128041
PCT Pub. Date: Oct. 20, 2011

(65) Prior Publication Data
US 2013/0041539 A1    Feb. 14, 2013

(30) Foreign Application Priority Data
Apr. 13, 2010   (FR) .................................. 10 01553

(51) Int. Cl.
*F02M 25/08* (2006.01)
*B60L 3/00* (2006.01)
*B60L 3/12* (2006.01)
(Continued)

(52) U.S. Cl.
CPC ....... *F02M 25/0827* (2013.01); *F02M 25/0809* (2013.01); *B60L 3/0023* (2013.01); *B60L 3/12* (2013.01); *B60L 11/14* (2013.01); *F02D 29/06* (2013.01); *F02M 25/08* (2013.01);
(Continued)

(58) Field of Classification Search
None
See application file for complete search history.

(56) References Cited

U.S. PATENT DOCUMENTS 7,753,035 B2    7/2010  Collet
2001/0029776 A1  10/2001  Streib
(Continued)

FOREIGN PATENT DOCUMENTS

FR       2900981     11/2007
WO    2006098522      9/2006

OTHER PUBLICATIONS

International Search Report dated May 16, 2011, in corresponding PCT application.

*Primary Examiner* — John R Olszewski
*Assistant Examiner* — Gerrad A Foster
(74) *Attorney, Agent, or Firm* — Young & Thompson

(57) ABSTRACT

A method for detecting the blockage of the purge valve (4) of a vapor filter (3) for a hybrid fuel drive vehicle including at least one internal combustion engine (1) and one electric generator/motor, includes a step of making the electric motor drive the internal combustion engine (1) so as to keep the internal combustion engine (1) at a constant speed, during a start-up phase or a phase preliminary to stopping, and at least one sequence of the following steps during this time that the internal combustion engine is kept at a constant speed: a step of opening the purge valve (4); a step of measuring at least one operating parameter of the electric motor; a step of comparing the values of the measured parameter before and after opening the purge valve (4) and of determining whether the variation in the parameter is above a predetermined threshold.

10 Claims, 1 Drawing Sheet

(51) Int. Cl.
  *B60L 11/14* (2006.01)
  *F02D 29/06* (2006.01)
  *F02D 41/04* (2006.01)
  *F02D 41/22* (2006.01)
  *F02N 11/04* (2006.01)

(52) U.S. Cl.
  CPC ............ *F02D 41/042* (2013.01); *F02D 41/221* (2013.01); *F02N 11/04* (2013.01); *Y02T 10/7077* (2013.01)
  USPC ........... 701/29.1; 701/22; 701/29.6; 123/519; 123/520; 96/110

(56) References Cited

U.S. PATENT DOCUMENTS

| | | |
|---|---|---|
| 2003/0196482 A1 | 10/2003 | Kanai et al. |
| 2006/0053868 A1 | 3/2006 | Chung et al. |
| 2007/0267232 A1 | 11/2007 | Saito |
| 2007/0283924 A1 * | 12/2007 | Collet ...................... 123/339.21 |

* cited by examiner

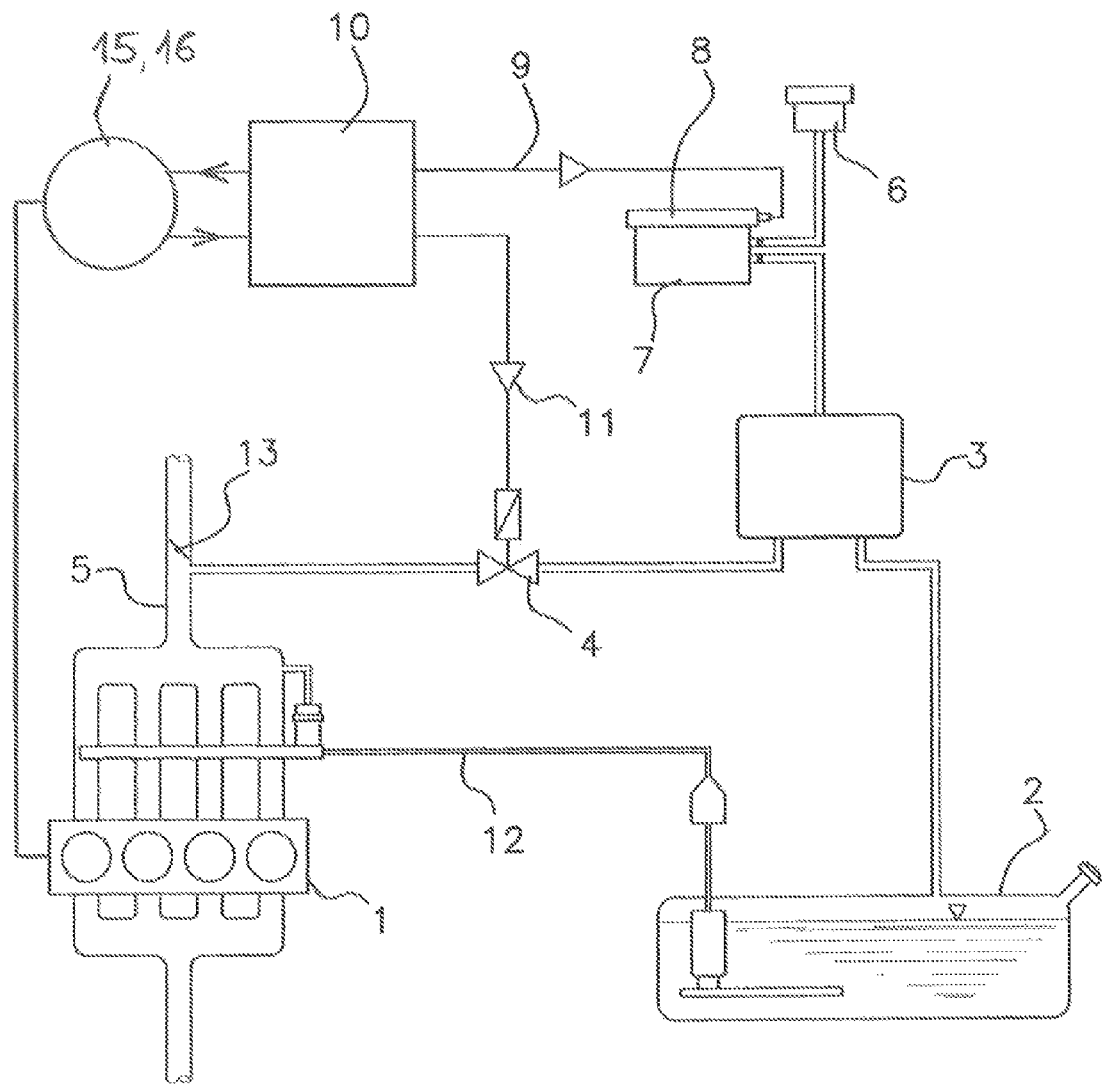

DIAGNOSTIC METHOD AND DEVICE FOR A PURGE VALVE OF A HYBRID MOTOR VEHICLE

BACKGROUND OF THE INVENTION

The invention relates to the field of vehicle drive systems. It relates more specifically to the detection of faults in the circuit of the gasoline vapor filter (also known as "canister") that is fitted to vehicles equipped with an internal combustion gasoline engine.

For many years, with a view, amongst other things, to reducing the pollution generated by gasoline engine vehicles, and at the same time to reducing their fuel consumption, the fuel tanks of these vehicles have been fitted with a device that recovers the gasoline vapors and reinjects them into the engine. This device, usually known to those skilled in the art as a canister, is situated near to the gasoline tank. It comprises a charcoal filter which fixes the gasoline vapors, notably when the engine is at a standstill. The injection of the vapors into the engine via the inlet pipe is commanded by the engine control unit (ECU) which controls the opening and closing of a purge valve.

Current standards in certain countries require the ability to detect the presence of leaked gasoline vapors in a vehicle. This entails diagnosing all possible leaks and faults with the components involved, notably the gasoline vapor filter (canister) and the purge valve.

Methods for detecting the operation of the purge valve using a test performed when the vehicle is at idle are known from the prior art. In these methods, a series of openings and closings of the purge valve are commanded, over a period of around ten seconds. If the valve is operational, then the admission of gasoline vapor to the engine should result in a change in various operating parameters such as the richness of the mixture, the torque, the engine speed, the inlet pressure, etc. The methods then detect whether one of these parameters, which may depend on the vehicle concerned, varies beyond a predetermined threshold, and this variation then validates correct operation of the vapor filter purge valve. Such a method is, for example, described in patent application FR 2 900 981 in the name of Siemens VDO Automotive.

Clearly this technique cannot be applied to the case of vehicles using a hybrid type drive which combine an internal combustion engine (ICE) with an electric generator/motor because these hybrid engines use electric mode at low speed and therefore do not have an engine idle speed at which correct operation can be checked using the principle mentioned above.

It is therefore an object of the present invention to propose a device which addresses the above problem.

A second object of the invention is to be simple and inexpensive to implement.

SUMMARY OF THE INVENTION

To this end, the invention is aimed at method for detecting the blockage of the purge valve of a gasoline vapor filter for a hybrid vehicle comprising at least an internal combustion engine and one electric generator/motor.

The method involves a step of making the electric motor drive the internal combustion engine so as to keep said internal combustion engine at a constant speed, during a start-up phase or a phase preliminary to stopping, and at least one sequence of the following steps during this time that the internal combustion engine is kept at a constant speed:

a step of changing the state of the purge valve, a step of measuring at least one operating parameter of the electric motor, a step of comparing the values of the measured parameter before and after the change of state of the purge valve and of determining whether the variation in said parameter is above a predetermined threshold.

For preference, the method comprises a repeat of the steps as described above so as to obtain a measurement that is statically significant.

According to various provisions that may be used in conjunction with one another:

the electric generator/motor operating parameter is a torque valve, the internal combustion engine is operated without fuel injection during the step in which the internal combustion engine is held at a constant non-idling speed.

A second aspect of the invention is aimed at a device for detecting the blockage of the purge valve of a gasoline vapor filter of a vehicle internal combustion engine, said device comprising:

means for making an electric generator/motor drive the internal combustion engine at a constant non-idling speed during a start-up phase or a phase preliminary to stopping, means for measuring at least one operating parameter of the electric generator/motor, means of comparing the values of the measured parameter before and after a change in state of the purge valve and of determining whether the variation in said parameter is above a predetermined threshold.

For preference, the means of measuring at least one operating parameter of the electric generator/motor comprise an electric generator/motor torque sensor.

BRIEF DESCRIPTION OF THE DRAWING

The objects and advantages of the invention will be better understood from reading the description and from studying the drawings of one particular embodiment, given by way of non limiting example, and for which the drawings in FIG. 1 depict a schematic view of the layout of the purge valve of the gasoline vapor filter within an internal combustion engine.

DESCRIPTION OF PREFERRED EMBODIMENTS

In the present example, the invention takes place in a land vehicle such as an automobile, of the hybrid drive type.

The vehicle, which is not depicted in FIG. 1, comprises an internal combustion engine 1 supplied with fuel contained in a fuel tank 2. The internal combustion engine 1 comprises an air intake manifold 5 and a fuel inlet pipe 12 which is connected to the fuel tank 2.

To collect fuel vapors emanating from the fuel tank 2, the latter is connected to a vapor filter 3, which is connected to the air intake manifold 5 via a purge valve 4. The purge valve 4 is able on command to place the vapor filter 3 in communication with the air intake manifold 5 of the internal combustion engine 1 so that at least some of the fuel vapors contained in the vapor filter 3 can be recycled.

The vapor filter 3 is also in communication with an air intake 6 via a vent and a vent valve 7 (known as an NVLD which stands for "natural vacuum leak detector") which are capable of placing the vapor filter 3 and the air intake 6 in communication. The vent valve 7 opens when the pressure in the vapor filter 3 exceeds a certain threshold or drops a below a certain threshold. This happens for example when the purge valve 4 is open and the internal combustion engine 1 is running. The vacuum thus created in the air inlet manifold 5 aspirates the fuel vapors contained in the vapor filter 3 and causes the vent valve 7 to open. Air then passes through the vapor filter 3 and becomes laden with fuel vapor before entering the air intake manifold 5.

The vent valve 7 also comprises a pressure switch 8 able to switch a signal according to the level of vacuum in the vapor filter 3. The pressure switch 8 delivers its signal via a line 9 to control electronics 10 which may be dedicated to the system or shared with other parts of the vehicle such as the internal combustion engine 1. The control electronics 10 are able to control the opening and closing of the purge valve 4 via a control line 11.

In this non limiting embodiment example the vehicle is of hybrid type and also comprises an electric generator/motor 15 which is capable of driving the internal combustion engine 1.

The method of detecting operation of the purge valve 4 comprises several steps.

In a first step, the control electronics 10 control the electric generator/motor 15 to make it drive the internal combustion engine 1 at a constant speed for a period of a few seconds (typically 1 to 3 seconds) during a phase of starting or of stopping said internal combustion engine 1.

The internal combustion engine 1 is driven by the electric generator/motor 15 without fuel being injected into the cylinders (and therefore without combustion).

In normal operation, as soon as the fuel vapors in the vapor filter 3 reach a certain pressure, the purge valve 4 opens automatically. It closes again when the pressure drops below a predetermined threshold.

During these changes in state of the purge valve 4, the control electronics 10 control the throttle valve 13 that controls the amount of air admitted to the engine, according to a control profile that is supposed, in theory, to keep the flow circulating in the cylinders constant.

During this phase in which engine speed is stabilized and the purge valve 4 and throttle valve 13 are being controlled, the control electronics 10 receive certain parameters measured at the electric generator/motor, for example the delivered electrical power and/or the torque etc. These parameters are measured by devices of types known to those skilled in the art and are indicative of the torque delivered by the internal combustion engine.

In an embodiment variant, the control electronics 10 control one or more cycles involving the opening and closing of the purge valve 4, and record the parameters measured.

It will be understood that, in this mode in which the internal combustion engine 1 is driven by the electric generator/motor 15, the internal combustion engine 1 behaves like a compressor. The torque produced by the electric generator/motor 15 to keep the internal combustion engine speed constant is therefore directly dependent on the mass of injected air circulating through said engine.

Two situations then arise:

1/Either the purge valve 4 is blocked (in the open or closed position). In such a case the air flow from the gasoline vapor filter remains substantially constant, whereas the control electronics 10 are anticipating a non-constant flow and correct the intake to the cylinders in order to keep the overall flow constant.

Because the flow of air circulating in the internal combustion engine is not constant, the torque or the electrical power or any other measured parameter indicative of the torque at the electric generator/motor 15 is not constant. The control electronics 10 therefore record parameters of which the variation over time is above a predetermined threshold, and this therefore characterizes defective operation of the purge valve 4.

2/Or the purge valve 4 operates correctly. In that case, the flow in the cylinders is actually constant. The control electronics 10 detect no significant variation in the measured parameter or parameters.

It will be appreciated that the method, as has just been explained, has several advantages.

First, it requires no dedicated sensor as the electric generator/motor 15 of a hybrid vehicle is usually fitted with motor torque sensors 16 and/or with sensors for measuring the delivered electrical power, etc.

It allows a purge valve 4 fault to be detected without any need to monitor a lengthy period of engine idle, thus making it possible to reduce the amount of pollution generated by the engine during this period.

Detection of operation can be performed during an engine shut-down phase, extended by a few seconds, and this then does not detract from the driveability of the car.

Given that the internal combustion engine 1 is operated by the electric generator/motor 15, it is possible to obtain an operating point (control of flow circulating through the cylinders) that is particularly stable, and this results in very precise diagnosis of the operation of the purge valve 4, the variability of the measured parameters being low, apart from the effect of a fault of the purge valve 4.

The scope of the present invention is not restricted to the embodiment details considered hereinabove by way of example, but on the contrary extends to modifications that are within the competence of the person skilled in the art.

In an embodiment variant, the internal combustion engine 1 is driven by the electric generator/motor 15 with injection being maintained so as to reduce the effort demanded of the electric generator/motor 15. The method however remains chiefly unchanged.

The invention claimed is:

1. A method for detecting blockage of a purge valve (4) of a gasoline vapor filter (3) for a hybrid drive vehicle comprising at least one internal combustion engine (1) and one electric generator/motor (15), the method comprising:
control electronics (10) making the electric generator/motor (15) drive the internal combustion engine (1) so as to keep said internal combustion engine (1) at a constant non-idling speed, during a start-up phase or a phase preliminary to stopping, and
at least one sequence of the following steps during a time that the electric generator/motor (15) drives the internal combustion engine at a constant speed:
changing the state of the purge valve (4),
measuring at least one operating parameter of the electric generator/motor (15) before and after changing the state of the purge valve (4), and
comparing the values of the measured parameter before and after the change of state of the purge valve (4) and of determining whether the variation in said parameter is above a predetermined threshold.

2. The method as claimed in claim 1, further comprising a repeat of the steps as described above so as to obtain a measurement that is statistically significant.

3. The method as claimed in claim 1, wherein the electric generator/motor (15) operating parameter is a parameter indicative of torque.

4. The method as claimed in claim 1, wherein the internal combustion engine (1) is operated without fuel injection during the step in which the internal combustion engine (1) is held at a constant non-idling speed.

5. A device for detecting blockage of a purge valve (4) of a gasoline vapor filter (3) of a vehicle internal combustion engine (1), comprising:

means for making an electric generator/motor (15) drive the internal combustion engine (1) at a constant non-idling speed during a start-up phase or a phase preliminary to stopping, means for measuring at least one operating parameter of the electric generator/motor (15), and means of comparing the values of the measured parameter before and after a change in state of the purge valve (4) and of determining whether the variation in said parameter is above a predetermined threshold.

6. The device as claimed in claim 5, wherein the means of measuring at least one operating parameter of the electric generator/motor (15) comprise an electric generator/motor torque sensor (16).

7. The method as claimed in claim 2, wherein the electric generator/motor (15) operating parameter is a parameter indicative of torque.

8. The method as claimed in claim 2, wherein the internal combustion engine (1) is operated without fuel injection during the step in which the internal combustion engine (1) is held at a constant non-idling speed.

9. The method as claimed in claim 3, wherein the internal combustion engine (1) is operated without fuel injection during the step in which the internal combustion engine (1) is held at a constant non-idling speed.

10. The method as claimed in claim 7, wherein the internal combustion engine (1) is operated without fuel injection during the step in which the internal combustion engine (1) is held at a constant non-idling speed.

\* \* \* \* \*